No. 763,659. PATENTED JUNE 28, 1904.
F. E. COLLINSON.
ANEROID BAROMETER.
APPLICATION FILED OCT. 5, 1903.

NO MODEL.

WITNESSES
John Buckler,
Edward H. Temple.

INVENTOR
Francis E. Collinson

No. 763,659. Patented June 28, 1904.

UNITED STATES PATENT OFFICE.

FRANCIS E. COLLINSON, OF WAKEFIELD, MASSACHUSETTS.

ANEROID BAROMETER.

SPECIFICATION forming part of Letters Patent No. 763,659, dated June 28, 1904.

Application filed October 5, 1903. Serial No. 175,866. (No model.)

*To all whom it may concern:*

Be it known that I, FRANCIS E. COLLINSON, a citizen of the United States, residing at Wakefield, in the county of Middlesex and State of Massachusetts, have invented a new and useful Improvement in Aneroid Barometers, of which the following, taken in connection with the accompanying drawings, is a specification.

My invention relates to an indicating device to be added to an ordinary aneroid barometer, by the aid of which the correct weather reading may be indicated for any given elevation; and it consists in connecting with the pressure-indicating hand of a barometer an auxiliary hand moving with the said pressure-hand, which may be set at such an angle with it as to point to the correct weather reading for the determined elevation.

To illustrate by example, an ordinary aneroid barometer has a single pointing-hand, which indicates the atmospheric pressure only, and around the dial the weather readings are arranged thus: At the number "30," indicating the pressure, the weather reading is "Fair," and at the number "29" the weather reading is "Rain." These, as well as the other weather readings, are correct only when the observer is using the instrument at about fifty feet above the sea-level, for the reason that at this elevation the atmospheric pressure is in fair weather about "30"—that is, the normal fair-weather pressure for this level is "30;" but this is not true for any other altitude. In fact, the normal fair-weather pressure decreases rapidly as the altitude increases. For instance, at an altitude of about one thousand feet the fair-weather pressure is "29" and at the altitude of about two thousand feet the fair-weather pressure is "28," and so on.

The object of the invention is to provide a convenient and inexpensive aneroid barometer that shall have a weather-indicating hand adapted to be so adjusted as to indicate the probable weather for the known altitude. This object I attain by means of the mechanism shown in the accompanying drawings, in which—

Figure 1:
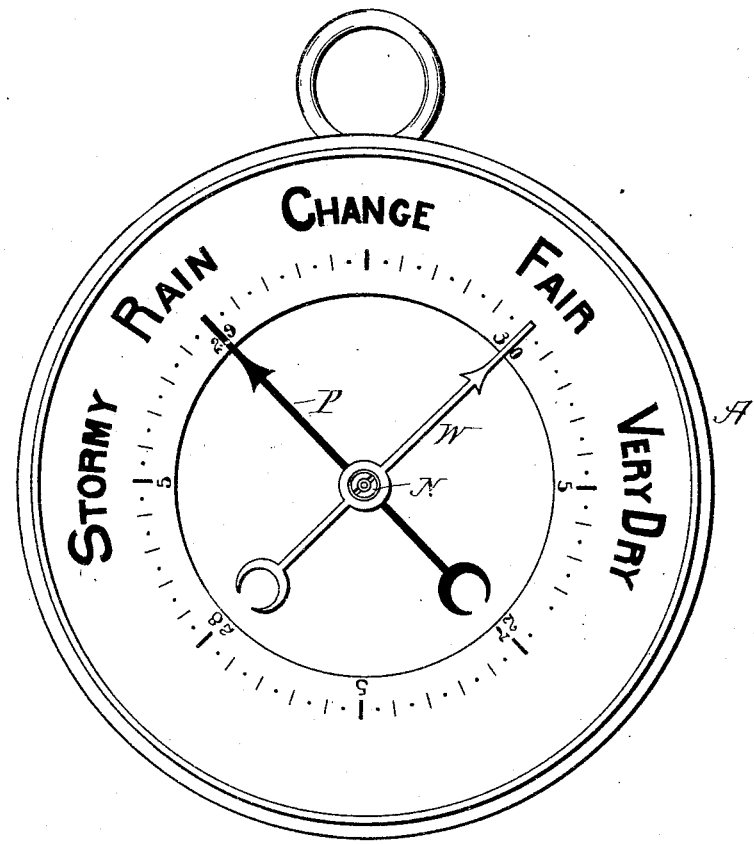
Figure 2:
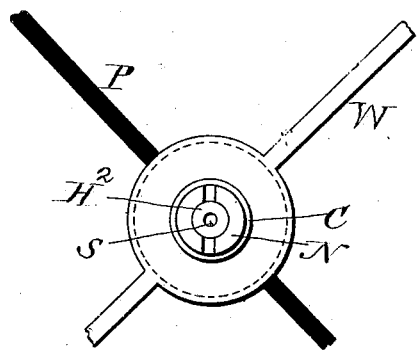
Figure 3:
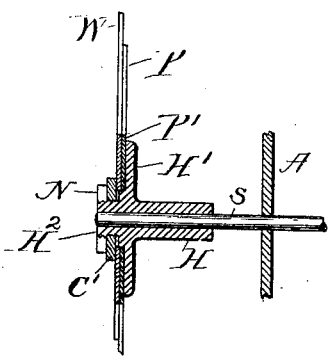

Figure 1 shows in elevation an ordinary aneroid barometer having one of my weather-indicating hands attached. Figs. 2 and 3 are details illustrating manner of connecting the hands to the arbor of the aneroid.

In the drawings, A represents an aneroid barometer of ordinary construction, except that it has an auxiliary hand. The arbor S of the aneroid is unchanged.

The hands of the aneroid—that is, the ordinary pressure-hand P and the weather-indicating hand W—are both connected to the quill H. (See Fig. 3.) This quill is frictionally held to the arbor S, as usual, but is constructed in a peculiar manner, as will be explained. The body part H of the quill is made with a flange H′ and a neck H². The pressure-indicating hand P is permanently attached to the flange H by its center disk P′; but the weather-indicating hand W may or may not be rigidly attached. The quill has a neck H², to which the washer C′ and the screw-nut N are attached.

When the instrument is to be used in locations not much above the sea-level, the two hands P and W may coincide; but in case it is to be used in elevated localities then the weather-hand W must be adjusted in relation to the pressure-hand P in accordance with the altitude. Thus if the altitude is one thousand feet then the normal fair-weather pressure would be twenty-nine inches and the instrument would be adjusted so that when the pressure-hand P was at "29" of the dial then the weather-hand W should be adjusted to stand at "Fair," and in case the elevation were two thousand feet the normal fair-weather pressure would be "28" of the dial, and the weather-hand W would have to be adjusted to stand at "Fair."

Having thus described my invention, what I claim as new, and desire to secure by Letters Patent, is—

1. In an aneroid barometer the combination of a dial having weather readings and pressure-graduations, a pressure-hand and an auxiliary hand adjustably attached to the pressure-hand and moving with it, substantially as and for the purpose set forth.

2. In an aneroid barometer the combination with a dial having weather readings and pressure-graduations, of a weather-hand, a pressure-hand, a quill attached to the arbor and having a flange to which the pressure-hand is fixed, said flange having a step portion of less width than the two hands and a screw-threaded neck portion to receive a nut and washer whereby said weather-hand is adapted to be adjustably attached to the pressure-hand.

In testimony whereof I have signed my name to this specification, in the presence of two subscribing witnesses, this 3d day of October, A. D. 1903.

FRANCIS E. COLLINSON.

Witnesses:
JOHN BUCKLES,
EDWARD H. TEMPLE.